(12) United States Patent
Liu et al.

(10) Patent No.: US 12,483,029 B2
(45) Date of Patent: Nov. 25, 2025

(54) STABILITY CRITERION FOR CONTROL LOOP OF GRID-CONNECTED CONVERTER UNDER WEAK GRID CONDITION

(71) Applicant: HEFEI UNIVERSITY OF TECHNOLOGY, Hefei (CN)

(72) Inventors: Fang Liu, Hefei (CN); Wei Liu, Hefei (CN); Yunyu Xu, Hefei (CN); Haodong Wang, Hefei (CN); Yan Li, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 83 days.

(21) Appl. No.: 18/034,408

(22) PCT Filed: Sep. 18, 2021

(86) PCT No.: PCT/CN2021/119220
§ 371 (c)(1),
(2) Date: Apr. 28, 2023

(87) PCT Pub. No.: WO2023/010659
PCT Pub. Date: Feb. 9, 2023

(65) Prior Publication Data
US 2023/0387686 A1 Nov. 30, 2023

(30) Foreign Application Priority Data

Aug. 5, 2021 (CN) .......................... 202110899076.2

(51) Int. Cl.
G06F 3/048 (2013.01)
H02J 3/00 (2006.01)
H02J 3/38 (2006.01)

(52) U.S. Cl.
CPC .............. *H02J 3/003* (2020.01); *H02J 3/381* (2013.01); *H02J 2203/10* (2020.01); *H02J 2203/20* (2020.01)

(58) Field of Classification Search
CPC ........ H02J 3/003; H02J 3/381; H02J 2203/10; H02J 2203/20; H02J 3/38; H02J 3/24
See application file for complete search history.

(56) References Cited

U.S. PATENT DOCUMENTS

| 2012/0112713 A1* | 5/2012 | Kuehn | H02J 3/36 |
| | | | 323/207 |
| 2021/0249862 A1* | 8/2021 | Awal | H02J 3/38 |
| 2022/0321025 A1* | 10/2022 | Bazargan | H02M 1/0012 |

FOREIGN PATENT DOCUMENTS

| CN | 106532685 A | 3/2017 |
| CN | 111146807 A | 5/2020 |

OTHER PUBLICATIONS

Zhong Xiang-Cheng, et al., esearch on the Stability of Multi PV Inverters Connected to Weak Grid Based on Impedance Analysis, Electrical Switch, 2016, pp. 27-34, No. 6.

(Continued)

*Primary Examiner* — Aleksey Olshannikov
(74) *Attorney, Agent, or Firm* — Bayramoglu Law Offices LLC (57) ABSTRACT

The present disclosure provides a method for determining a stability criterion for a control loop of a grid-connected converter under a weak grid condition, and belongs to the field of power control. The method includes performing a sampling, obtaining an expression of a transfer function of each of control loops of a grid-connected converter, further obtaining an expression of a transfer function for indicating stability performance of the system, obtaining an amplitude expression and a phase expression according to the transfer function, and providing a stability criterion for the control loop of the grid-connected converter under a weak grid condition and a stability margin expression of the system. The stability criterion for the control loop is significant and provided by a simple method, can quickly and accurately determine the stability of the grid-connected converter system under the weak grid condition, and is helpful for the parameters design of the controllers.

1 Claim, 7 Drawing Sheets

(56) References Cited

OTHER PUBLICATIONS

Xin Chen, et al., Impedance-Phased Dynamic Control Method for Grid-Connected Inverters in a Weak Grid, IEEE Transactions on Power Electronics, 2017, pp. 274-283, vol. 32 No. 1.

Limin Mei, et al., Synchronization Stability of PLL-Based Power Converters Connected to Weak AC Grid, 2021 6th Asia Conference on Power and Electrical Engineering (ACPEE), 2021.

Xie Xiaorong, et al., New Issues and Classification of Power System Stability With High Shares of Renewables and Power Electronics, Proceedings of the CSEE, 2021, pp. 461-474, vol. 41 No. 2.

Liu Ni, et al., Comparison and Applicability Analysis of Small-signal Modeling Methods for Grid-connected Inverter, Automation of Electric Power Systems, 2018, pp. 134-141, Vo.42 No. 23.

Bo Wen, et al, Small-Signal Stability Analysis of Three-Phase AC Systems in the Presence of Constant Power Loads Based on Measured d-q Frame Impedances, IEEE Transactions on Power Electronics, 2015, pp. 5952-5963, vol. 30 No. 10.

\* cited by examiner

STABILITY CRITERION FOR CONTROL LOOP OF GRID-CONNECTED CONVERTER UNDER WEAK GRID CONDITION

CROSS-REFERENCE TO RELATED APPLICATION

This application is the national phase entry of International Application No. PCT/CN2021/119220, filed on Sep. 18, 2021, which is based upon and claims priority to Chinese Patent Application No. 202110899076.2, filed on Aug. 5, 2021, the entire contents of which are incorporated herein by reference.

TECHNICAL FIELD

The present disclosure relates to stability criteria for control loops of grid-connected converters, particularly to a stability criterion for a control loop of a grid-connected converter under a weak grid condition, and belongs to the field of power control.

BACKGROUND

With the depletion of conventional fossil fuels such as coal and petroleum in recent years, the provision of global energy is being faced with a critical challenge. More and more renewable energy sources are incorporated into a power grid through power electronic interfaces, resulting in high penetration of power electronic grid-connected interfaces into the power grid. Hence, the stability of the power system with the high penetration of power electronic grid-connected interfaces, particularly the stability of a grid-connected converter under a weak grid condition, has become a issue of great concern. In the weak grid system with the high penetration of power electronic grid-connected interfaces, determining the stability of the system simply, quickly, and accurately is extremely valuable and significant to optimize the parameters design of the controllers.

As mentioned in the paper *New Issues and Classification on Stability of Power System under High Penetrations of Renewable Energy Sources and Power Electronic Devices* (Xiaorong Xie, Jingbo He, Hangyin Mao, and Haozhi Li, *New Issues and Classification on Stability of Power System under High Penetrations of Renewable Energy Sources and Power Electronic Devices* [J], Proceedings of the Chinese Society for Electrical Engineering (CSEE), 2021, 41(02): 461-475), because of the energy transition and technological advancement, the power system is gradually characterized by a high penetration of renewable energy resources and a high penetration of power electronic devices. As such, the stability issues of the power system, like broadband oscillation caused by interaction between the power electronic devices, as well as between the power electronic devices and the power grid and interaction between the controllers, become more complicated. Of particular concern is the instability issue under the weak grid condition.

In the paper *Comparison and Applicability Analysis of Small-signal Modeling Methods for Grid-connected Inverter* (Ni Liu, Changhua Zhang, Xue Duan, Xin Chen, Shuheng Chen, and Qunying Liu, *Comparison and Applicability Analysis of Small-signal Modeling Methods for Grid-connected Inverter* [J], Automation of Electric Systems, 2018, 42(23):134-141), an application of a state-space model in the grid-connected converter system is introduced. However, when the stability is analyzed with the state-space method, the final complete system model cannot be obtained unless all parameters of the grid-connected converter and constitutional units in the power grid are obtained. In the grid-connected converter system with the high penetration of power electronic interfaces, the constitutional units and parameters of the system are changing all the time, which makes the stability analysis of the system complicated.

In the paper *Small-signal Stability Analysis of Three-phase AC Systems in the Presence of Constant Power Loads based on Measured d-q Frame Impedances* (B Wen, D Boroyevich, R Burgos, et al., *Small-signal Stability Analysis of Three-phase AC Systems in the Presence of Constant Power Loads based on Measured d-q Frame Impedances* [J], IEEE Transactions on Power Electronics, 2015, 30(10): 5952-5963), theoretical bases for impedance stability are described. Moreover, methods for analyzing the impedance stability of the three-phase grid-connected converter and criteria for determining the impedance stability are discussed. In the impedance analysis method, both the grid-connected converter and the power grid are viewed as two independent subsystems to establish their impedance models. The stability of the system is analyzed according to an impedance ratio of the grid-connected converter to the power grid by virtue of the Nyquist criterion. The impedance analysis method can simplify the stability analysis of the system effectively over the state-space method. However, in case of changes of control structures and controller parameters in the converter, the converter-side impedance model is to be re-derived, which is also a tricky and complicated process.

From the analysis above, the stability of the power system with the high penetration of power electronic grid-connected interfaces, particularly the stability of the grid-connected converter system under the weak grid condition, has received widespread attention and research. Research for analyzing system stability by deriving the complete state-space model or the complete impedance model of the system can show the stability of the system comprehensively and accurately but involves a complicated derivation process. It would be significant and valuable to provide a simple stability analysis method to enrich the stability analysis theory of the grid-connected converter and the practical engineering applications, by establishing only transfer function models in a control loop and then combining to obtain an expression for indicating the stability performance of the system and further guide the parameters design of the controllers.

In conclusion, there have been the following problems in the existing art:
1. Regarding either the impedance analysis method or the state-space averaging method for analyzing stability of a grid-connected converter under a weak grid, the mathematical model must be re-derived with a tricky and complicated process when the control structures of the system change.
2. The methods, such as the state-space averaging method, can determine the stability of the system but cannot directly provide parameters for designing each loop of the controller through a stability margin and other indicators. As a result, the stability operation design of the grid-connected converter under the weak grid is hardly realized.

SUMMARY

To overcome limitations of the above various technical solutions, the present disclosure provides a stability criterion for a control loop of a grid-connected converter under a weak grid condition for the above two problems.

The objective of the present disclosure is achieved as follows. The present disclosure provides a stability criterion for a control loop of a grid-connected converter under a weak grid condition. The control loop of the grid-connected converter includes a current control loop and a phase-locked loop (PLL). The determination of the stability criterion for a control loop of a grid-connected converter under a weak grid condition includes the following steps:

step 1: performing a sampling to obtain an output current $I_g$ of the grid-connected converter and an output voltage $U_g$ of the grid-connected converter, and providing an expression of a grid impedance link $G_1(s)$ of the grid-connected converter, an expression of a closed-loop transfer function $G_2(s)$ for the PLL of the grid-connected converter, and an expression of a closed-loop transfer function $G_3(s)$ for the current control loop of the grid-connected converter without considering the influence of the PLL, where the expression of the grid impedance link $G_1(s)$ of the grid-connected converter is as follows:

$$G_1(s) = -\frac{I_g}{U_g}(sL_{grid} + R_{grid}),$$

where s is a Laplace operator, $L_{grid}$ is an inductive component of the grid impedance, and $R_{grid}$ is a resistive component of the grid impedance;

the expression of the closed-loop transfer function $G_2(s)$ for the PLL of the grid-connected converter is as follows:

$$G_2(s) = \frac{2 \times \xi \times \omega_{pll} \times s + \omega_{pll}^2}{s^2 + 2 \times \xi \times \omega_{pll} \times s + \omega_{pll}^2},$$

where $\xi$ is a damping ratio of the PLL, and $\omega_{pll}$ is a control bandwidth of the PLL; and the expression $G_3(s)$ of the closed-loop transfer function $G_3(s)$ for the current control loop of the grid-connected converter without considering the influence of the PLL is as follows:

$$G_3(s) = \frac{G_{CL}G_{main}}{1 + G_{CL}G_{main}},$$

where $G_{CL}$ is a transfer function for a proportional-integral (PI) link of the current control loop, and $G_{main}$ is a transfer function for a filtration link of the grid-connected converter;

step 2: providing an expression of an open-loop transfer function $G_{IL}(s)$ for the current control loop of the grid-connected converter considering the influence of the PLL:

$$G_{IL}(s) = G_1(s) \times G_2(s) \times G_3(s)$$

$$= -\left[\frac{I_g}{U_g}(sL_{grid} + R_{grid})\right] \times \left[\frac{2 \times \xi \times \omega_{pll} \times s + \omega_{pll}^2}{s^2 + 2 \times \xi \times \omega_{pll} \times s + \omega_{pll}^2}\right] \times$$

$$\left[\frac{G_{CL}G_{main}}{1 + G_{CL}G_{main}}\right]$$

-continued $$= -\frac{I_g}{U_g} \times \frac{(2\xi\omega_{pll}s + \omega_{pll}^2)(sL_{grid} + R_{grid})}{s^2 + 2\xi\omega_{pll}s + \omega_{pll}^2} \times \frac{G_{CL}G_{main}}{1 + G_{CL}G_{main}}$$

step 3: providing an expression of a combined transfer function $G_{pll\_grid}(s)$ for a grid impedance and the PLL of the grid-connected converter, and performing identical transformation on the open-loop transfer function $G_{IL}(s)$ for the current control loop in step 2, where the expression of the combined transfer function $G_{pll\_grid}(s)$ for the grid impedance and the PLL of the grid-connected converter is as follows:

$$G_{pll\_grid}(s) = G_1(s) \times G_2(s)$$

$$= -\frac{I_g}{U_g} \times \frac{(sL_{grid} + R_{grid})(2 \times \xi \times \omega_{pll} \times s + \omega_{pll}^2)}{s^2 + 2 \times \xi \times \omega_{pll} s + \omega_{pll}^2};$$

the identical transformation on the open-loop transfer function $G_{IL}(s)$ for the current control loop leads to:

$$G_{IL}(s) = G_{pll\_grid}(s) \times G_3(s)$$

$$= G_{pll\_grid}(s)/(1/G_3(s)) ,$$

$$= G_{pll\_grid}(s)/G_{current}(s)$$

where $G_{current}(s) = 1/G_3(s)$, which is labeled as a criterion transfer function for the current control loop of the grid-connected converter without considering the influence of the PLL; and step 4: further providing a stability criterion for the control loop of the grid-connected converter under a weak grid condition according to a transfer function of each link in the foregoing three steps by specifically:

step 4.1: obtaining a phase expression and an amplitude expression of each of the combined transfer function $G_{pll\_grid}(s)$ for the grid impedance and the PLL of the grid-connected converter and the criterion transfer function $G_{current}(s)$ for the current control loop of the grid-connected converter without considering the influence of the PLL in the frequency domain, where an amplitude and a phase of the combined transfer function $G_{pll\_grid}(s)$ for the grid impedance and the PLL of the grid-connected converter in the frequency domain are respectively labeled as a combined amplitude $A_{pll\_grid}(\omega)$ and a combined phase $\psi_{pll\_grid}(\omega)$, the combined amplitude $A_{pll\_grid}(\omega)$ and the combined phase $\psi_{pll\_grid}(\omega)$ being respectively expressed by:

$$\begin{cases} A_{pll\_grid}(\omega) = 20\log\left(\frac{I_g}{U_g} \times \frac{\sqrt{\omega^2 L_{grid}^2 + R_{grid}^2} \times \sqrt{(2\xi\omega_{pll}\omega)^2 + \omega_{pll}^4}}{\sqrt{(2\xi\omega_{pll}\omega)^2 + (\omega_{pll}^2 - \omega^2)^2}}\right) \\ \psi_{pll\_grid}(\omega) = \arctan\left(\frac{\omega L_{grid}}{R_{grid}}\right) + \arctan\left(\frac{2\xi\omega\omega_{pll}}{\omega_{pll}^2}\right) - \arctan\left(\frac{2\xi\omega\omega_{pll}}{\omega_{pll}^2 - \omega^2}\right) \end{cases}$$

where $\omega$ is a rotational angular frequency of the frequency domain; and an amplitude and a phase of the criterion transfer function $G_{current}(s)$ for the current control loop of the grid-connected converter without considering the influence of the PLL in the frequency domain are respectively labeled as a current amplitude $A_{current}(\omega)$ and a current phase $\psi_{current}(\omega)$, the current amplitude $A_{current}(\omega)$ and the current phase $\psi_{current}(\omega)$ being respectively expressed by:

$$\begin{cases} A_{current}(\omega) = \dfrac{|G_{CL}(\omega)||G_{main}(\omega)|}{|1+G_{CL}(\omega)G_{main}(\omega)|} \\ \psi_{current}(\omega) = \angle G_{CL}(\omega) + \angle G_{main}(\omega) - \angle(1+G_{CL}(\omega)G_{main}(\omega)) \end{cases},$$

where $G_{CL}(\omega)$ is an expression of the transfer function $G_{CL}$ for the PI link of the current control loop in the frequency domain, $|G_{CL}(\omega)|$ is an amplitude of the transfer function $G_{CL}$ for the PI link of the current control loop in the frequency domain, $G_{main}(\omega)$ is an expression of the transfer function $G_{main}$ for the filtration link of the grid-connected converter in the frequency domain, $|G_{main}(\omega)|$ is an amplitude of the transfer function $G_{main}$ for the filtration link of the grid-connected converter in the frequency domain, $|1G_{CL}(\omega)G_{main}(\omega)|$ is an amplitude of $1+G_{CL}(\omega)G_{main}(\omega)$ in the frequency domain, $\angle G_{CL}(\omega)$ is a phase of $G_{CL}(\omega)$ in the frequency domain, $\angle G_{main}(\omega)$ is a phase of $G_{main}(\omega)$ in the frequency domain, and $\angle(1+G_{CL}(\omega)G_{main}(\omega))$ is a phase of $1+G_{CL}(\omega)G_{main}(\omega)$ in the frequency domain;

step 4.2: providing the stability criterion for the control loop of the grid-connected converter under the weak grid condition according to the amplitude expression and the phase expression obtained in step 4.1 by determining that the grid-connected converter system is stable when both an amplitude stability condition and a phase stability condition are satisfied; otherwise, determining that the control loop of the grid-connected converter is unstable, where the stability criterion for the control loop of the grid-connected converter under the weak grid condition is determined as follows:

the amplitude for the control loop of the grid-connected converter is stable if a phase difference between the combined phase $\psi_{pll\_grid}(\omega)$ and the current phase $\psi_{current}(\omega)$ is 180°, and $A_{current}(\omega_{180°}) > A_{pll\_grid}(\omega_{180°})$;

the phase for the control loop of the grid-connected converter is stable if the combined amplitude $A_{pll\_grid}(\omega)$ is the same as the current amplitude $A_{current}(\omega)$, and $\psi_{pll\_grid}(\omega_{crossover}) - \psi_{current}(\omega_{crossover}) - 180° > 0$; and the whole grid-connected converter is stable if the control loop of the grid-connected converter can both satisfy the amplitude stability condition and the phase stability condition, where, $\omega_{180°}$ is a corresponding angular frequency when the phase difference between the combined phase $\psi_{pll\_grid}(\omega)$ and the current phase $\psi_{current}(\omega)$ is 180°;

$A_{current}(\omega_{180°})$ is an amplitude of the criterion transfer function $G_{current}(s)$ for the current control loop of the grid-connected converter without considering the influence of the PLL when the angular frequency is $\omega_{180°}$;

$A_{pll\_grid}(\omega_{180°})$ is an amplitude of the combined transfer function for the grid impedance and the PLL of the grid-connected converter when the angular frequency is $\omega_{180°}$;

$\omega_{crossover}$ is a corresponding angular frequency when the combined amplitude $A_{pll\_grid}(\omega)$ is the same as the current amplitude $A_{current}(\omega)$;

$\psi_{current}(\omega_{crossover})$ is a phase of the criterion transfer function $G_{current}(s)$ for the current control loop of the grid-connected converter without considering the influence of the PLL when the angular frequency is $\omega_{crossover}$; and $\psi_{pll\_grid}(\omega_{crossover})$ is a phase of the combined transfer function $G_{pll\_grid}(s)$ for the grid impedance and the PLL of the grid-connected converter when the angular frequency is $\omega_{crossover}$; and step 4.3: providing an amplitude margin expression $A_M$ and a phase margin expression $P_M$ of the grid-connected converter system under the weak grid condition according to the phase expression and the amplitude expression of each of the combined transfer function $G_{pll\_grid}(s)$ for the grid impedance and the PLL of the grid-connected converter and the criterion transfer function $G_{current}(s)$ for the current control loop of the grid-connected converter without considering the influence of the PLL in the frequency domain in step 4.1 and in combination with the stability criterion for the control loop in step 4.2:

$$\begin{cases} A_M = A_{current}(\omega_{180°}) - A_{pll\_grid}(\omega_{180°}) \\ P_M = \psi_{pll\_grid}(\omega_{crossover}) - \psi_{current}(\omega_{crossover}) - 180° \end{cases}.$$

Compared with the existing art, the present disclosure has the following beneficial effects:

1. The stability criterion for a control loop of a grid-connected converter under a weak grid condition provided by the present disclosure takes the strength of the power grid into account. Regardless of how the strength of the power grid changes, by obtaining a closed-loop transfer function of each loop, the present disclosure can determine the stability of the grid-connected converter system and can accurately obtain the stability margin of the system. This greatly facilitates the parameters design of controllers for the grid-connected converter under the weak grid condition.

2. Compared with other stability analysis methods, the present disclosure greatly simplifies the solving process for the expression of the transfer function of the grid-connected converter system using a simple method, which is significant and has a high accuracy.

DETAILED DESCRIPTION OF THE EMBODIMENTS

The present disclosure will be further described below in conjunction with the accompanying drawings and specific embodiments.

Figure 1:
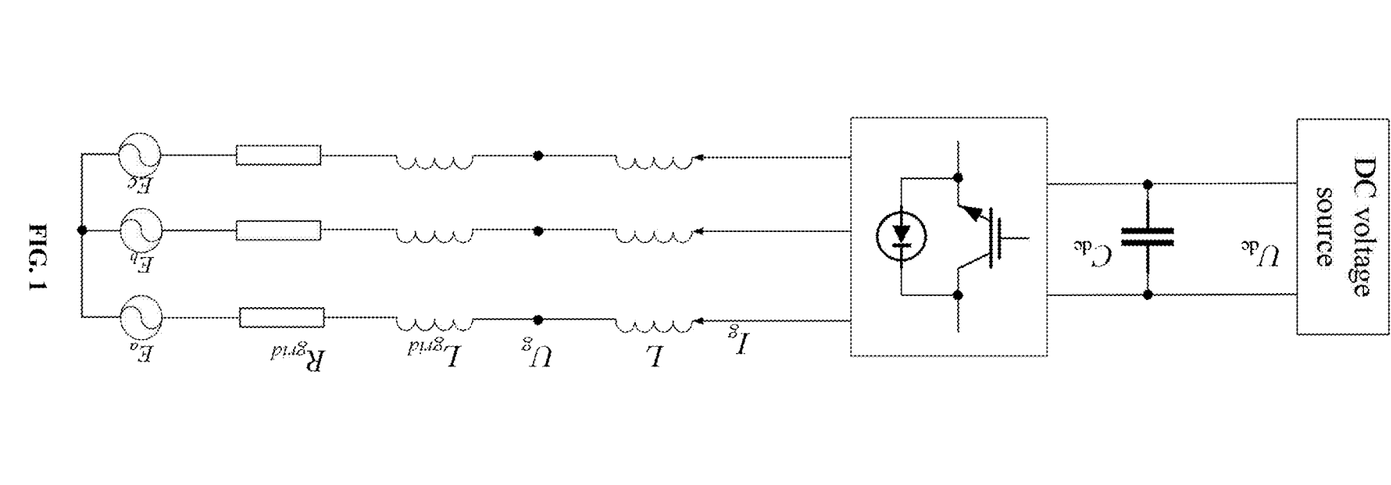
FIG. 1 illustrates a topological structure of a grid-connected converter according to the present disclosure.

FIG. 1 illustrates a topological structure of a grid-connected converter according to an embodiment of the present disclosure. As shown in FIG. 1, the topological structure includes a direct-current (DC) voltage source $U_{dc}$, a DC-side filter capacitor $C_{dc}$, a three-phase half-bridge inverter, an L filter, and a three-phase alternating-current (AC) power grid. The DC voltage source $U_{dc}$ is connected to an input terminal of the inverter through the filter capacitor $C_{dc}$. An output terminal of the inverter is connected to the three-phase AC power grid through the L filter. $L_{grid}$ is a corresponding inductive component of a grid impedance, and is labeled as the inductive component $L_{grid}$ of the grid impedance. $R_{grid}$ is a corresponding resistive component of the grid impedance, and is labeled as the resistive component $R_{grid}$ of the grid impedance.

In implementation of the present disclosure, the following electrical parameters are provided: The system has a DC voltage source $U_{dc}$=750V, a rated capacity of 30 kVA for the grid-connected converter, an effective phase voltage $E_a$=$E_b$=$E_c$=220V for the three-phase power grid, a switching frequency $f_{sw}$=10 kHz, sampling time $T_s$=100 μs, and a filter inductance L=2 mH.

The present disclosure provides a stability criterion for a control loop of a grid-connected converter under a weak grid condition. The control loop of the grid-connected converter includes a current control loop and a PLL. The determination of the stability criterion for a control loop of a grid-connected converter under a weak grid condition includes the following steps:

step 1: performing a sampling to obtain an output current $I_g$ of the grid-connected converter and an output voltage $U_g$ of the grid-connected converter, and providing an expression of a grid impedance link $G_1(s)$ of the grid-connected converter, an expression of a closed-loop transfer function $G_2(s)$ for the PLL of the grid-connected converter, and an expression of a closed-loop transfer function $G_3(s)$ for the current control loop of the grid-connected converter without considering the influence of the PLL, where the expression of the grid impedance link $G_1(s)$ of the grid-connected converter is as follows:

$$G_1(s) = -\frac{I_g}{U_g}(sL_{grid} + R_{grid}),$$

where s is a Laplace operator, $L_{grid}$ is an inductive component of the grid impedance, and $R_{grid}$ is a resistive component of the grid impedance;

the expression of the closed-loop transfer function $G_2(s)$ for the PLL of the grid-connected converter is as follows:

$$G_s(s) = \frac{2 \times \xi \times \omega_{pll} \times s + \omega_{pll}^2}{s^2 + 2 \times \xi \times \omega_{pll} \times s + \omega_{pll}^2},$$

where ξ is a damping ratio of the PLL, and $\omega_{pll}$ is a control bandwidth of the PLL; and the expression $G_3(s)$ of the closed-loop transfer function $G_3(s)$ for the current control loop of the grid-connected converter without considering the influence of the PLL is as follows:

$$G_3(s) = \frac{G_{CL}G_{main}}{1 + G_{CL}G_{main}},$$

where $G_{CL}$ is a transfer function for a proportional-integral (PI) link of the current control loop, and $G_{main}$ is a transfer function for a filtration link of the grid-connected converter;

step 2: providing an expression of an open-loop transfer function $G_{IL}(s)$ for the current control loop of the grid-connected converter considering the influence of the PLL:

$$G_{IL}(s) = G_1(s) \times G_2(s) \times G_3(s)$$

$$= \left[\frac{I_g}{U_g}(sL_{grid} + R_{grid})\right] \times \left[\frac{2 \times \xi \times \omega_{pll} \times s + \omega_{pll}^2}{s^2 + 2 \times \xi \times \omega_{pll} \times s + \omega_{pll}^2}\right] \times$$

$$\left[\frac{G_{CL}G_{main}}{1 + G_{CL}G_{main}}\right]$$

$$= -\frac{I_g}{U_g} \times \frac{(2\xi\omega_{pll}s + \omega_{pll}^2)(sL_{grid} + R_{grid})}{s^2 + 2\xi\omega_{pll}s + \omega_{pll}^2} \times$$

$$\frac{G_{CL}G_{main}}{1 + G_{CL}G_{main}}$$

step 3: providing an expression of a combined transfer function $G_{pll\_grid}(s)$ for a grid impedance and the PLL of the grid-connected converter, and performing identical transformation on the open-loop transfer function $G_{IL}(s)$ for the current control loop in step 2, where the expression of the combined transfer function $G_{pll\_grid}(s)$ for the grid impedance and the PLL of the grid-connected converter is as follows:

$$G_{pll\_grid}(s) = G_1(s) \times G_2(s)$$

$$= -\frac{I_g}{U_g} \times \frac{(sL_{grid} + R_{grid})(2 \times \xi \times \omega_{pll} \times s + \omega_{pll}^2)}{s^2 + 2 \times \xi \times \omega_{pll} \times s + \omega_{pll}^2};$$

the identical transformation on the open-loop transfer function $G_{IL}(s)$ for the current control loop leads to:

$$G_{IL}(s) = G_{pll\_grip}(s) \times G_3(s)$$
$$= G_{pll\_grip}(s)/(1/G_3(s))$$
$$= G_{pll\_grip}(s)/(G_{current}(s))$$

where $G_{current}(s) = 1/G_3(s)$, which is labeled as a criterion transfer function for the current control loop of the grid-connected converter without considering the influence of the PLL; and step 4: further providing a stability criterion for the control loop of the grid-connected converter under a weak grid condition according to a transfer function of each link in the foregoing three steps by specifically:

step 4.1: obtaining a phase expression and an amplitude expression of each of the combined transfer function $G_{pll\_grid}(s)$ for the grid impedance and the PLL of the grid-connected converter and the criterion transfer function $G_{current}(s)$ for the current control loop of the grid-connected converter without considering the influence of the PLL in the frequency domain, where an amplitude and a phase of the combined transfer function $G_{pll\_grid}(s)$ for the grid impedance and the PLL of the grid-connected converter in the frequency domain are respectively labeled as a combined amplitude $A_{pll\_grid}(\omega)$ and a combined phase $\psi_{pll\_grid}(\omega)$, the combined amplitude $A_{pll\_grid}(\omega)$ and the combined phase $\psi_{pll\_grid}(\omega)$ being respectively expressed by:

$$\begin{cases} A_{pll\_gird}(\omega) = 20\log\left(\frac{I_g}{U_g} \times \frac{\sqrt{\omega^2 L_{grid}^2 + R_{grid}^2} \times \sqrt{(2\xi\omega_{pll}\omega)^2 + \omega_{pll}^4}}{\sqrt{(2\xi\omega_{pll}\omega)^2 + (\omega_{pll}^2 - \omega^2)^2}}\right) \\ \psi_{pll\_gird}(\omega) = \arctan\left(\frac{\omega L_{grid}}{R_{grid}}\right) + \arctan\left(\frac{2\xi\omega\omega_{pll}}{\omega_{pll}^2}\right) - \arctan\left(\frac{2\xi\omega\omega_{pll}}{\omega_{pll}^2 - \omega^2}\right) \end{cases}$$

where $\omega$ is a rotational angular frequency of the frequency domain; and an amplitude and a phase of the criterion transfer function $G_{current}(s)$ for the current control loop of the grid-connected converter without considering the influence of the PLL in the frequency domain are respectively labeled as a current amplitude $A_{current}(\omega)$ and a current phase $\psi_{current}(\omega)$, the current amplitude $A_{current}(\omega)$ and the current phase $\psi_{current}(\omega)$ being respectively expressed by:

$$\begin{cases} A_{current}(\omega) = \frac{|G_{CL}(\omega)||G_{main}(\omega)|}{|1 + G_{CL}(\omega)G_{main}(\omega)|} \\ \psi_{current}(\omega) = \angle G_{CL}(\omega) + \angle G_{main}(\omega) - \angle(1 + G_{CL}(\omega)G_{main}(\omega)) \end{cases}$$

where $G_{CL}(\omega)$ is an expression of the transfer function $G_{CL}$ for the PI link of the current control loop in the frequency domain, $|G_{CL}(\omega)|$ is an amplitude of the transfer function $G_{CL}$ for the PI link of the current control loop in the frequency domain, $G_{main}(\omega)$ is an expression of the transfer function $G_{main}$ for the filtration link of the grid-connected converter in the frequency domain, $|G_{main}(\omega)|$ is an amplitude of the transfer function $G_{main}$ for the filtration link of the grid-connected converter in the frequency domain, $|1+G_{CL}(\omega)G_{main}(\omega)|$ is an amplitude of in the frequency domain, $1+G_{CL}(\omega)G_{main}(\omega)$ in the frequency domain, $\angle G_{CL}(\omega)$ is a phase of $G_{CL}(\omega)$ in the frequency domain, $\angle G_{main}(\omega)$ is a phase of $G_{main}(\omega)$ in the frequency domain, and $\angle(1+G_{CL}(\omega)G_{main}(\omega))$ is a phase of $1+G_{CL}(\omega)G_{main}(\omega)$ in the frequency domain;

step 4.2: providing the stability criterion for the control loop of the grid-connected converter under the weak grid condition according to the amplitude expression and the phase expression obtained in step 4.1 by determining that the grid-connected converter system is stable when both an amplitude stability condition and a phase stability condition are satisfied; otherwise, determining that the control loop of the grid-connected converter is unstable, where the stability criterion for the control loop of the grid-connected converter under the weak grid condition is determined as follows:

the amplitude for the control loop of the grid-connected converter is stable if a phase difference between the combined phase $\psi_{pll\_grid}(\omega)$ and the current phase $\psi_{current}(\omega)$ is 180°, and $A_{current}(\omega_{180°}) > A_{pll\_grid}(\omega_{180°})$;

the phase for the control loop of the grid-connected converter is stable if the combined amplitude $A_{pll\_grid}(\omega)$ is the same as the current amplitude $A_{current}(\omega)$, and $\psi_{pll\_grid}(\omega_{crossover}) - \psi_{current}(\omega_{crossover}) - 180° > 0$; and the whole grid-connected converter is stable if the control loop of the grid-connected converter can both satisfy the amplitude stability condition and the phase stability condition, where, $\omega_{180°}$ is a corresponding angular frequency when the phase difference between the combined phase $\psi_{pll\_grid}(\omega)$ and the current phase $\psi_{current}(\omega)$ is 180°;

$A_{current}(\omega_{180°})$ is an amplitude of the criterion transfer function $G_{current}(s)$ for the current control loop of the grid-connected converter without considering the influence of the PLL when the angular frequency is $\omega_{180°}$;

$A_{pll\_grid}(\omega_{180°})$ is an amplitude of the combined transfer function for the grid impedance and the PLL of the grid-connected converter when the angular frequency is $\omega_{180°}$;

$\omega_{crossover}$ is a corresponding angular frequency when the combined amplitude $A_{pll\_grid}(\omega)$ is the same as the current amplitude $A_{current}(\omega)$;

$\psi_{current}(\omega_{crossover})$ is a phase of the criterion transfer function $G_{current}(s)$ for the current control loop of the grid-connected converter without considering the influence of the PLL when the angular frequency is $\omega_{crossover}$; and $\psi_{pll\_grid}(\omega_{crossover})$ is a phase of the combined transfer function $G_{pll\_grid}(s)$ for the grid impedance and the PLL of the grid-connected converter when the angular frequency is $\omega_{crossover}$; and step 4.3: providing an amplitude margin expression $A_M$ and a phase margin expression $P_M$ of the grid-connected converter system under the weak grid condition according to the phase expression and the amplitude expression of each of the combined transfer function $G_{pll\_grid}(s)$ for the grid impedance and the PLL of the grid-connected converter and the criterion transfer function $G_{current}(s)$ for the current control loop of the grid-connected converter without considering the influence of the PLL in the frequency domain in step 4.1 and in combination with the stability criterion for the control loop in step 4.2:

$$\begin{cases} A_M = A_{current}(\omega_{180°}) - A_{pll\_grid}(\omega_{180°}) \\ P_M = \psi_{pll\_grid}(\omega_{crossover}) - \psi_{current}(\omega_{crossover}) - 180° \end{cases}.$$

Figure 2:
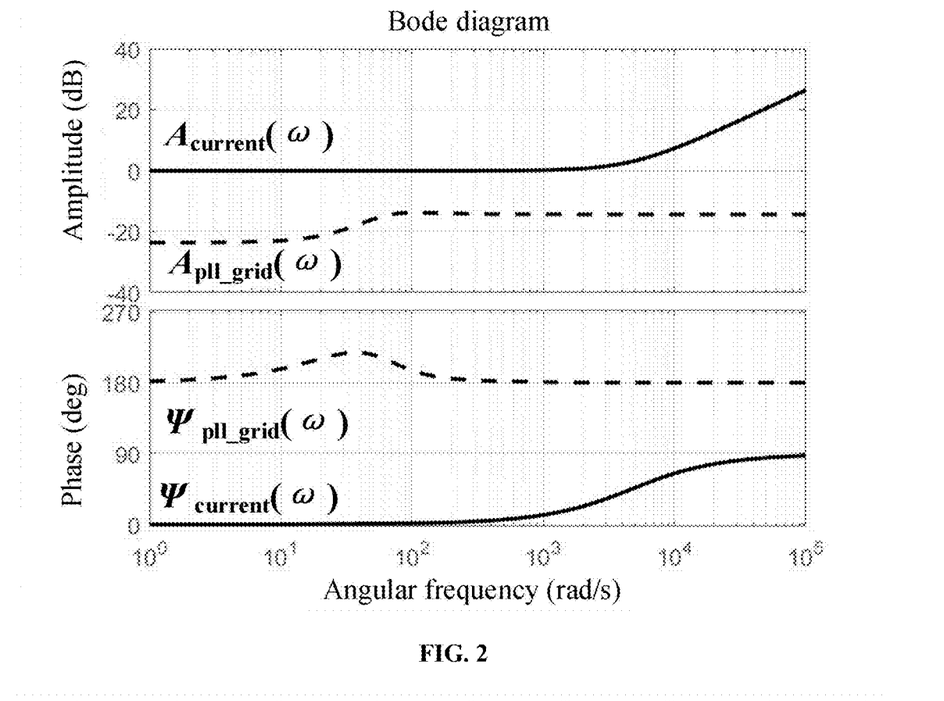
FIG. 2 illustrates a Bode diagram of an open-loop transfer function $G_{IL}(s)$ for a current control loop that takes into account the influence of a PLL when the strength of a power grid is SCR=1.5, the design bandwidth of the current loop is $\omega_{CL}$=4,750 rad/s, and the design bandwidth of the PLL is $\omega_{pll}$=64.5 rad/s.
Figure 3:
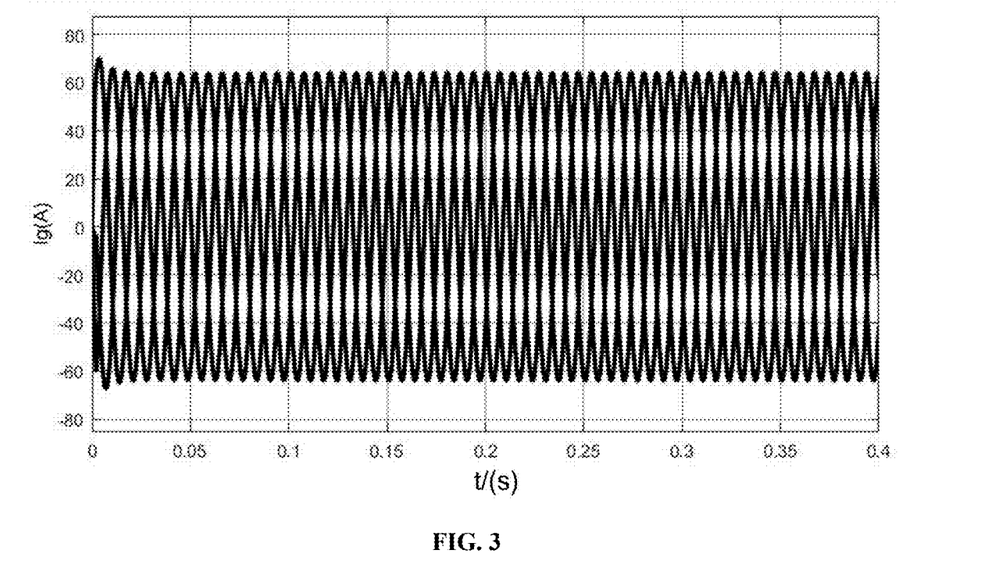
FIG. 3 illustrates a simulation waveform of an output current $I_g$ of a grid-connected converter when the strength of a power grid is SCR=1.5, the design bandwidth of a current loop is $\omega_{CL}$=4,750 rad/s, and the design bandwidth of the PLL is $\omega_{pll}$=64.5 rad/s.

In the embodiment, there are two cases of the grid-connected converter system under the weak grid condition:

First case: The grid-connected converter system has a short-circuit ratio SCR=1.5, and the grid impedance has an inductive component $L_{grid}$=10.2 mH and a resistive component $R_{grid}$=0.32Ω. When a control bandwidth of the current loop is determined to be $\omega_{CL}$=4,750 rad/s, the control bandwidth of the PLL can be calculated according to the controller design method of the grid-connected converter under the weak grid, and the stability and stability margin of the system can be determined according to the stability criterion for the control loop. Hereinafter, the present disclosure provides descriptions on three cases where the PLL has different control bandwidths:

(1) When the PLL has a control bandwidth $\omega_{pll}$=64.5 rad/s the Bode diagram of the open-loop transfer function $G_{IL}(s)$ for the current control loop considering the influence of the PLL is as shown in FIG. 2. In the figure, upper and lower portions respectively represent an amplitude-frequency curve and a phase-frequency curve of the Bode diagram. The horizontal coordinate represents angular frequency in units of rad/s. For the amplitude-frequency curve, the vertical coordinate represents amplitude in units of dB. For the phase-frequency curve, the vertical coordinate represents phase in units of deg. As can be seen from FIG. 2, $\omega_{180°}$=292 rad/s, $A_{current}(\omega_{180°})$=0.0165 dB, $A_{pll\_grid}(\omega_{180°})$=−14.2 dB, and the amplitude margin $A_M$=$A_{current}(\omega_{180°})$−$A_{pll\_grid}(\omega_{2°})$=0.0165 dB−(−14.2)dB=142165 dB>0. Since the amplitude margin is greater than 0, the amplitude satisfies the stability condition of the system. In the full band range, $A_{current}(\omega)$ is always greater than $A_{pll\_grid}(\omega)$, such that the phase margin of the system always satisfies the stability condition. The waveform for the output current of the grid-connected converter system is as shown in FIG. 3. According to the waveform for the output current, the system always keeps stable in this condition. In FIG. 3, the horizontal coordinate represents time t in units of second (s), while the vertical coordinate represents the output current $I_g$ of the grid-connected converter in a unit of A.

Figure 4:
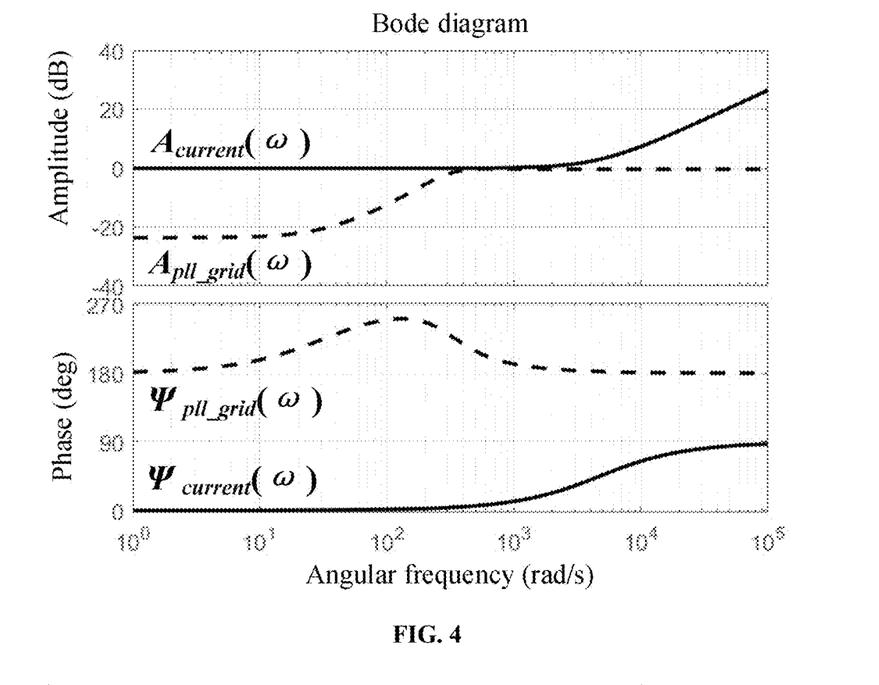
FIG. 4 illustrates a Bode diagram of an open-loop transfer function $G_{IL}(s)$ for a current control loop that takes into account the influence of a PLL when the strength of a power grid is SCR=1.5, the design bandwidth of the current loop is $\omega_{CL}$=4,750 rad/s, and the design bandwidth of the PLL is $\omega_{pll}$=320.4 rad/s.
Figure 5:
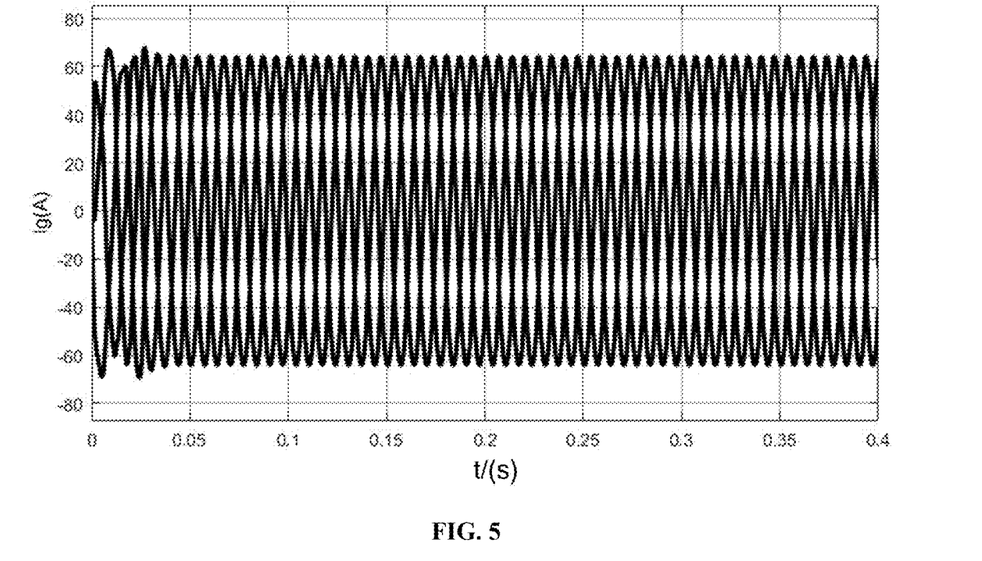
FIG. 5 illustrates a simulation waveform of an output current $I_g$ of a grid-connected converter when the strength of a power grid is SCR=1.5, the design bandwidth of a current loop is $\omega_{CL}$=4,750 rad/s, and the design bandwidth of the PLL is $\omega_{pll}$=320.4 rad/s.

(2) When the PLL has a control bandwidth $\omega_{pll}$=320.4 rad/s, the Bode diagram of the open-loop transfer function $G_{IL}(s)$ for the current control loop considering the influence of the PLL is as shown in FIG. 4. In the figure, upper and lower portions respectively represent an amplitude-frequency curve and a phase-frequency curve of the Bode diagram. The horizontal coordinate represents angular frequency in units of rad/s. For the amplitude-frequency curve, the vertical coordinate represents an amplitude in units of dB. For the phase-frequency curve, the vertical coordinate represents phase in units of deg. As can be seen from FIG. 4, $\omega_{180°}$=999 rad/s, $A_{current}(\omega_{180°})$=0.188 dB, $A_{pll\_grid}(\omega_{180°})$=−0.223 dB, and the amplitude margin $A_M$=$A_{current}(\omega_{180°})$−$A_{pll\_grid}(\omega_{180°})$=0.188 dB−(−0.233) dB=0.421 dB>0. The amplitude margin is relatively small but still satisfies the stability condition. In the full band range, $A_{current}(\omega)$ is always greater than $A_{pll\_grid}(\omega)$, such that the phase margin of the system always satisfies the stability condition. The waveform for the output current of the grid-connected converter system is as shown in FIG. 5. According to the waveform for the output current, the system always keeps stable in this condition. In FIG. 5, the horizontal coordinate represents time t in units of s, while the vertical coordinate represents the output current $I_g$ of the grid-connected converter in units of A.

Figure 6:
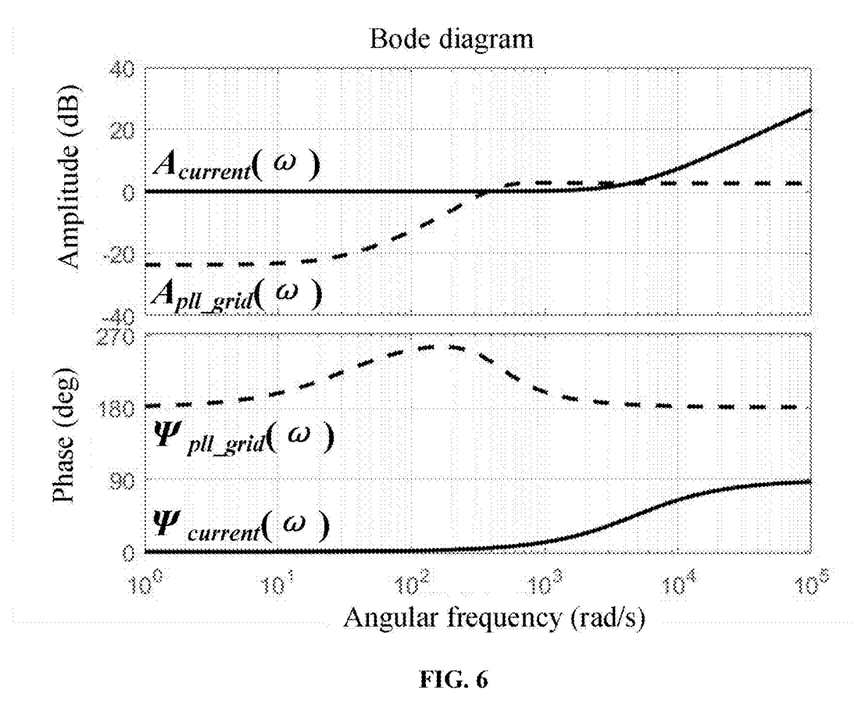
FIG. 6 illustrates a Bode diagram of an open-loop transfer function $G_{IL}(s)$ for a current control loop that takes into account the influence of a PLL when the strength of a power grid is SCR=1.5, the design bandwidth of the current loop is $\omega_{CL}$=4,750 rad/s, and the design bandwidth of the PLL is $\omega_{pll}$=452.3 rad/s.
Figure 7:
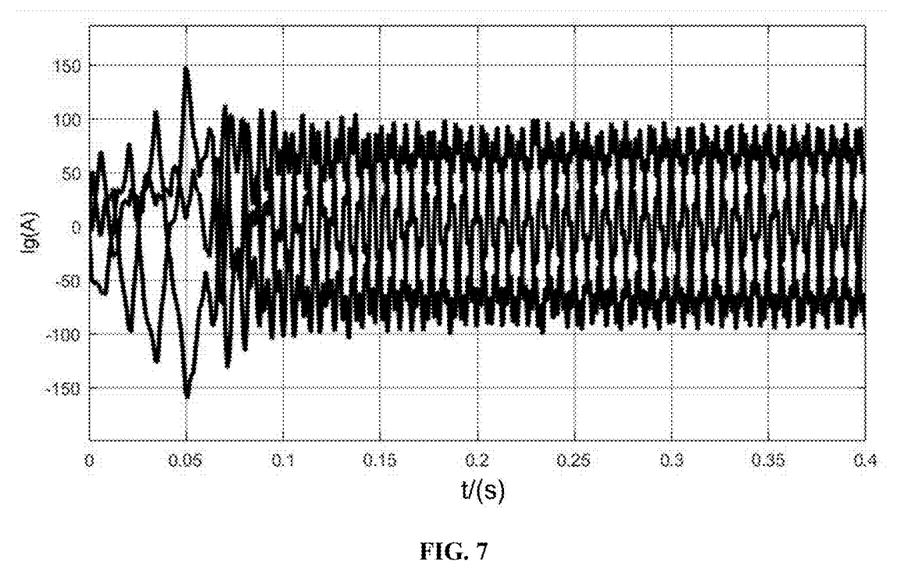
FIG. 7 illustrates a simulation waveform of an output current $I_g$ of a grid-connected converter when the strength of a power grid is SCR=1.5, the design bandwidth of a current loop is $\omega_{CL}$=4,750 rad/s, and the design bandwidth of the PLL is $\omega_{pll}$=452.3 rad/s.

(3) When the PLL has a control bandwidth $\omega_{pll}$=452.3 rad/s the Bode diagram of the open-loop transfer function $G_{IL}(s)$ for the current control loop considering the influence of the PLL is as shown in FIG. 6. In the figure, upper and lower portions respectively represent an amplitude-frequency curve and a phase-frequency curve of the Bode diagram. The horizontal coordinate represents an angular frequency in units of rad/s. For the amplitude-frequency curve, the vertical coordinate represents amplitude in units of dB. For the phase-frequency curve, the vertical coordinate represents phase in units of deg. As can be seen from FIG. 6, $\omega_{180°}$=1,240 rad/s, $A_{current}(\omega_{180°})$=0.29 dB, $A_{pll\_grid}(\omega_{180°})$=2.8 dB, and the amplitude margin $A_M$=$A_{current}(\omega_{180°})$−$A_{pll\_grid}(\omega_{180°})$=0.29 dB−(2.8)dB=−2.51 dB<0. The amplitude does not satisfy the stability condition of the system, $\omega_{crossover1}$=381 rad/s, and $\omega_{crossover2}$=4,290 rad/s. The system has the phase margin $P_{M1}$=$\psi_{pll\_grid}(\omega_{crossover1})$−$\psi_{current}(\omega_{crossover1})$−180°=54.43°>0, and $P_{M2}$=$\psi_{pll\_grid}(\omega_{crossover2})$−$\psi_{current}(\omega_{crossover2})$−180°=−38.2°<0, so the phase does not satisfy the stability condition of the system either. $\omega_{crossover1}$ and $\omega_{crossover2}$ are respectively first and second angular frequencies when $A_{pll\_grid}(\omega)$ and $A_{current}(\omega)$ are the same twice. The waveform for the output current of the grid-connected converter system is as shown in FIG. 7. According to the waveform for the output current, the system is unstable in this condition. In FIG. 7, the horizontal coordinate represents time t in units of s, while the vertical coordinate represents the output current $I_g$ of the grid-connected converter in units of A.

Figure 8:
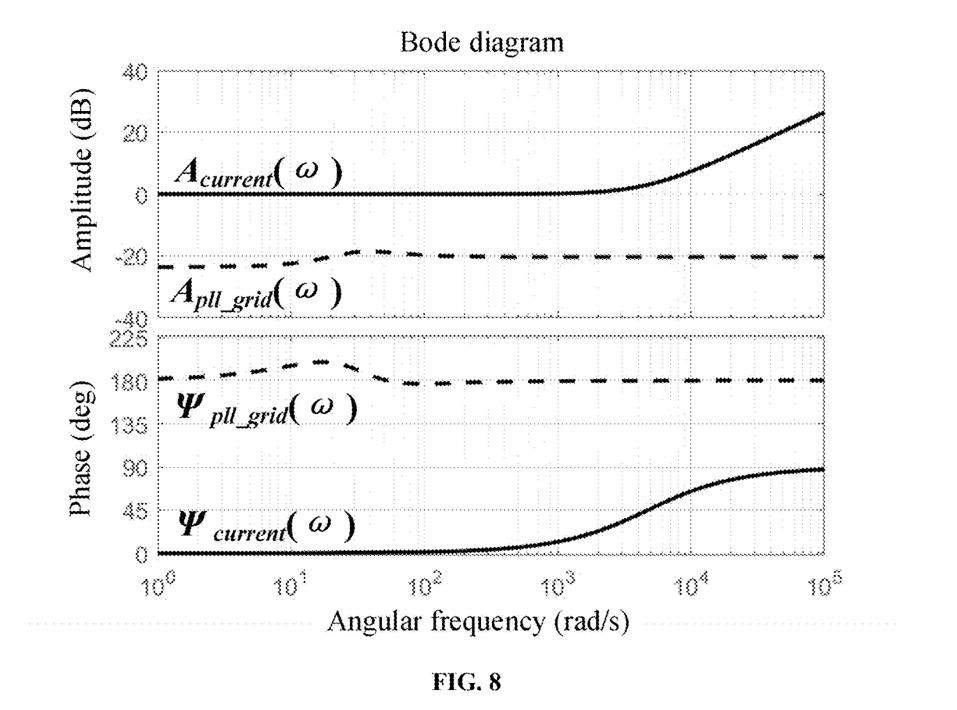
FIG. 8 illustrates a Bode diagram of an open-loop transfer function $G_{IL}(s)$ for a current control loop that takes into account the influence of a PLL when the strength of a power grid is SCR=1.1, the design bandwidth of the current loop is $\omega_{CL}$=4,750 rad/s, and the design bandwidth of the PLL is $\omega_{pll}$=32.3 rad/s.
Figure 9:
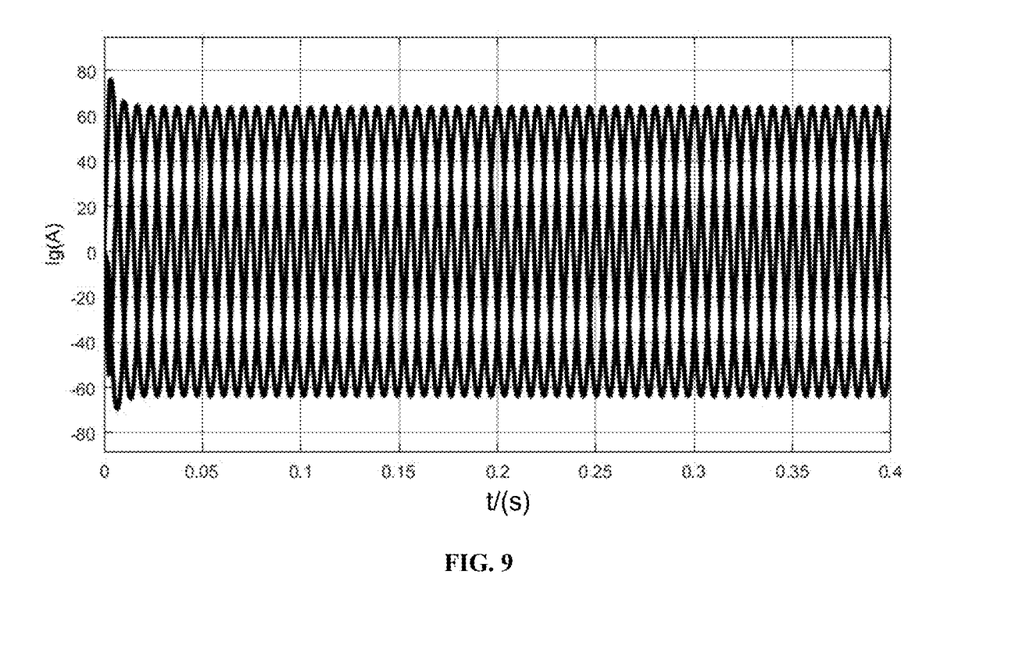
FIG. 9 illustrates a simulation waveform of an output current $I_g$ of a grid-connected converter when the strength of a power grid is SCR=1.1, the design bandwidth of a current loop is $\omega_{CL}$=4,750 rad/s, and the design bandwidth of the PLL is $\omega_{pll}$=32.3 rad/s.

Second case: The grid-connected converter system has a short-circuit ratio SCR=1.1, and the grid impedance has an inductive component $L_{grid}$=13.0 mH and a resistive component $R_{grid}$=0.436Ω. When the current loop has a control bandwidth $\omega_{CL}$4,750 rad/s, the control bandwidth of the PLL can be calculated according to the controller design method of the grid-connected converter under the weak grid, and the stability and stability margin of the system can be determined according to the stability criterion for the control loop. Hereinafter, the present disclosure provides descriptions of three cases where the PLL has different control bandwidths:

(1) When the PLL has a control bandwidth $\omega_{pll}$=32.3 rad/s, the Bode diagram of the open-loop transfer function $G_{iL}(s)$ for the current control loop considering the influence of the PLL is as shown in FIG. 8. In the figure, upper and lower portions respectively represent an amplitude-frequency curve and a phase-frequency curve of the Bode diagram. The horizontal coordinate represents angular frequency in units of rad/s. For the amplitude-frequency curve, the vertical coordinate represents an amplitude, in a unit of dB. For the phase-frequency curve, the vertical coordinate represents phase in units of deg. As can be seen from FIG. 8, $\omega_{180°}$=52 rad/s, $A_{current}(\omega_{180°})$=0.001 dB, $A_{pll\_grid}(\omega_{180°})$=−16.1 dB, and the amplitude margin $A_M$=$A_{current}(\omega_{180°})$=0.001 dB−(−16.1)dB=16.101 dB>0. The amplitude satisfies the stability condition of the system. In the full band range, $A_{current}(\omega)$ is always greater than $A_{pll\_grid}(\omega)$, such that the phase satisfies the stability condition of the system. The waveform for the output current of the grid-connected converter system is as shown in FIG. 9. According to the waveform for the output current, the system always keeps stable in this condition. In FIG. 9, the horizontal coordinate represents time t in units of s, while the vertical coordinate represents the output current $I_g$ of the grid-connected converter in units of A.

Figure 10:
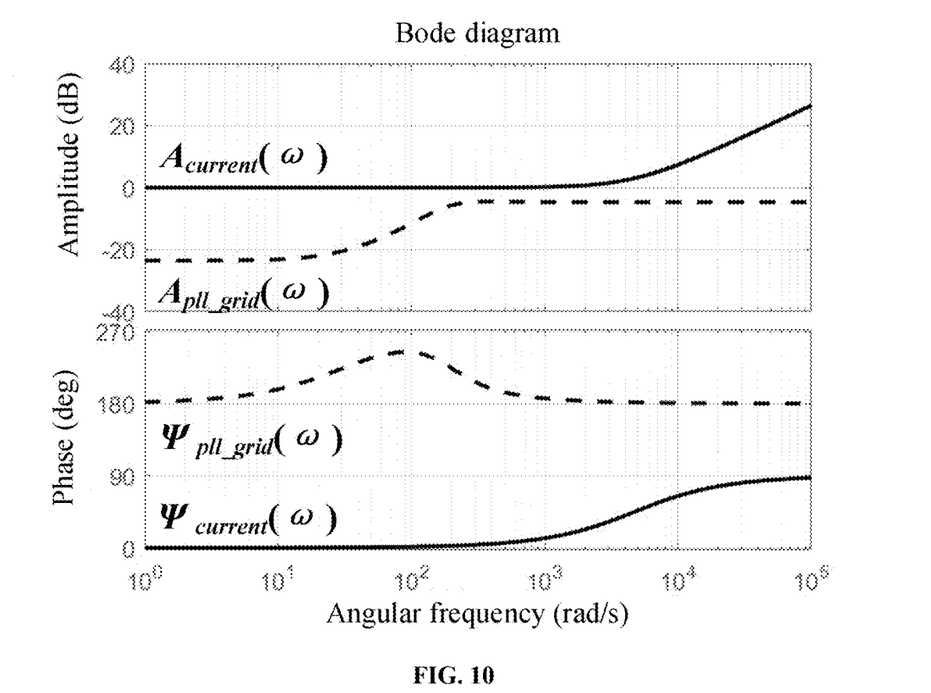
FIG. 10 illustrates a Bode diagram of an open-loop transfer function $G_{IL}(s)$ for a current control loop that takes into account the influence of a PLL when the strength of a power grid is SCR=1.1, the design bandwidth of the current loop is $\omega_{CL}$=4,750 rad/s, and the design bandwidth of the PLL is $\omega_{pll}$=193.7 rad/s.
Figure 11:
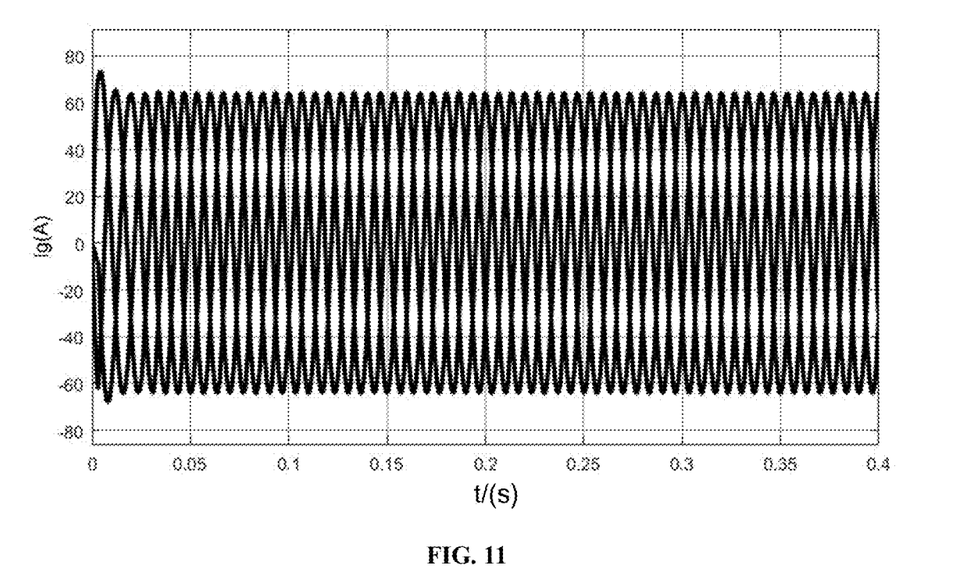
FIG. 11 illustrates a simulation waveform of an output current $I_g$ of a grid-connected converter when the strength of a power grid is SCR=1.1, the design bandwidth of a current loop is $\omega_{CL}$=4,750 rad/s, and the design bandwidth of the PLL is $\omega_{pll}$=193.7 rad/s.

(2) When the PLL has a control bandwidth $\omega_{pll}$=193.7 rad/s, the Bode diagram of the open-loop transfer function $G_{iL}(s)$ for the current control loop considering the influence of the PLL is as shown in FIG. 10. In the figure, upper and lower portions respectively represent an amplitude-frequency curve and a phase-frequency curve of the Bode diagram. The horizontal coordinate represents angular frequency in units of rad/s. For the amplitude-frequency curve, the vertical coordinate represents an amplitude in units of dB. For the phase-frequency curve, the vertical coordinate represents phase in units of deg. As can be seen from FIG. 10, $\omega_{180°}$=743 rad/s, $A_{current}(\omega_{180°})$=0.106 dB, $A_{pll\_grid}(\omega_{180°})$=−1.94 dB and the amplitude margin $A_M$=$A_{current}(\omega_{180°})$−$A_{pll\_grid}(\omega_{180°})$=0.106 dB−(−1.94) dB=2.046 dB>0. The amplitude margin is relatively small but still satisfies the stability condition of the system. In the full band range, $A_{current}(\omega)$ is always greater than $A_{pll\_grid}(\omega)$, such that the phase satisfies the stability condition of the system. The waveform for the output current of the grid-connected converter system is as shown in FIG. 11. According to the waveform for the output current, the system always keeps stable in this condition. In FIG. 11, the horizontal coordinate represents time t in units of s, while the vertical coordinate represents the output current $I_g$ of the grid-connected converter in units of A.

Figure 12:
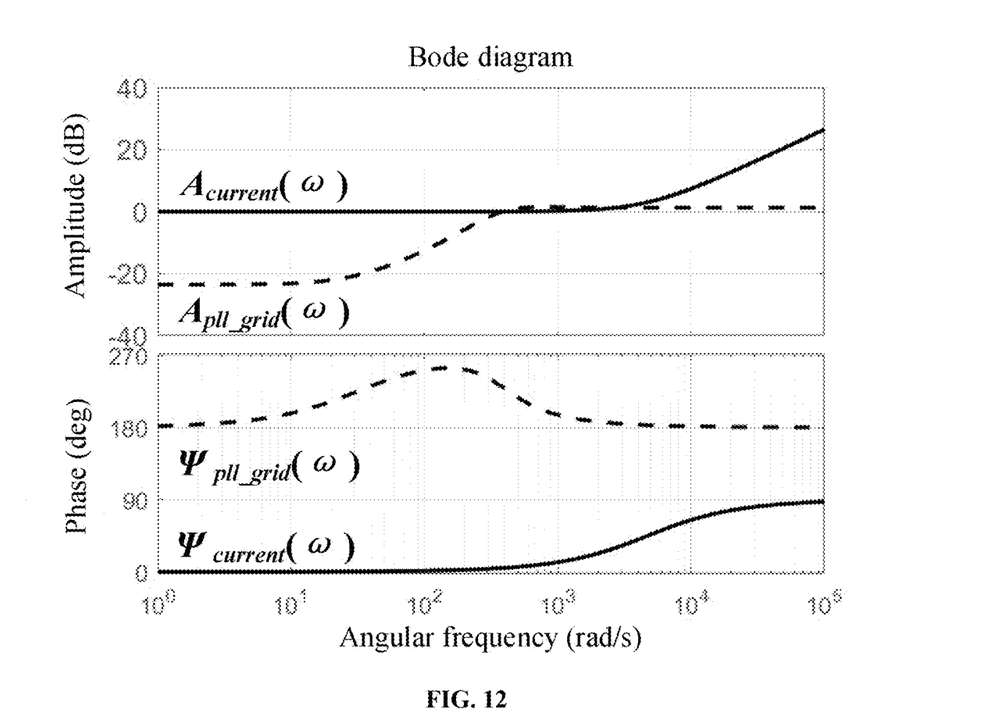
FIG. 12 illustrates a Bode diagram of an open-loop transfer function $G_{IL}(s)$ for a current control loop that takes into account the influence of a PLL when the strength of a power grid is SCR=1.1, the design bandwidth of the current loop is $\omega_{CL}$=4,750 rad/s, and the design bandwidth of the PLL is $\omega_{pll}$=387.4 rad/s.
Figure 13:
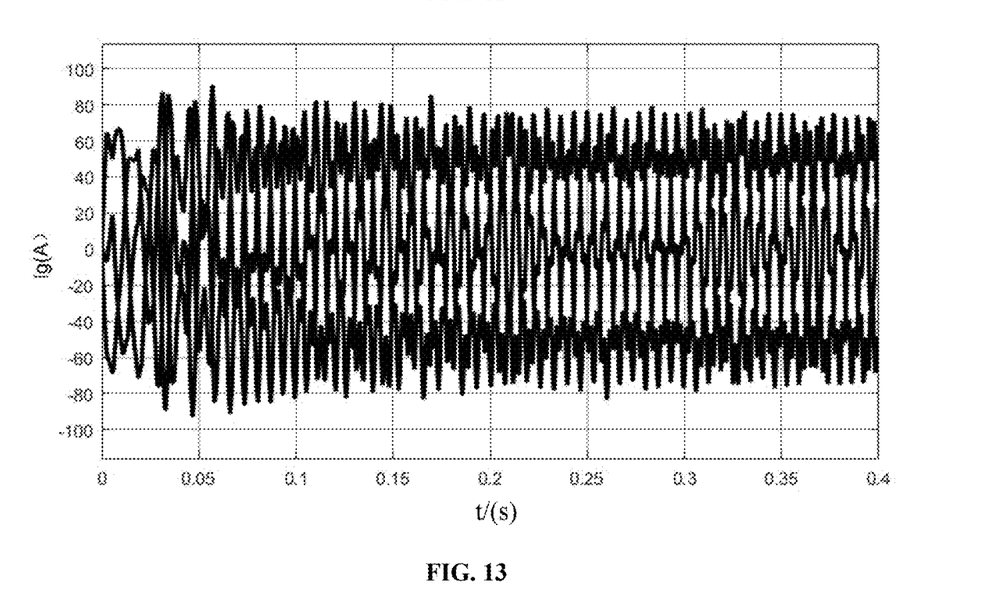
FIG. 13 illustrates a simulation waveform of an output current $I_g$ of a grid-connected converter when the strength of a power grid is SCR=1.1, the design bandwidth of a current loop is $\omega_{CL}$=4,750 rad/s, and the design bandwidth of the PLL is $\omega_{pll}$=387.4 rad/s.

(3) When the PLL has a control bandwidth $\omega_{pll}$=387.4 rad/s, the Bode diagram of the open-loop transfer function $G_{iL}(s)$ for the current control loop considering the influence of the PLL is as shown in FIG. 12. In the figure, upper and lower portions respectively represent an amplitude-frequency curve and a phase-frequency curve of the Bode diagram. The horizontal coordinate represents angular frequency in units of rad/s. For the amplitude-frequency curve, the vertical coordinate represents an amplitude in units of dB. For the phase-frequency curve, the vertical coordinate represents phase in units of deg. As can be seen from FIG. 12, $\omega_{180°}$=1,130 rad/s, $A_{current}(\omega_{180°})$=0.24 dB, $A_{pll\_grid}(\omega_{180°})$=4.14 dB, and the amplitude margin $A_M$=$A_{current}(\omega_{180°})$−$A_{pll\_grid}(\omega_{180°})$=0.24 dB−4.14 dB=−3.9 dB<0. The amplitude does not satisfy the stability condition of the system, $\omega_{crossover1}$=275 rad/s, and $\omega_{crossover2}$=5190 rad/s. The system has the phase margin $P_{M1}$=$\psi_{pll\_grid}(\omega_{crossover1})$−$\psi_{current}(\omega_{crossover1})$−180°=41.68°>0, and $P_{M2}$=$\psi_{pll\_grid}(\omega_{crossover2})$−$\psi_{current}(\omega_{crossover2})$−180°=−49.8°<0, so the phase does not satisfy the stability condition of the system either. The waveform for the output current of the grid-connected converter system is as shown in FIG. 13. According to the waveform for the output current, the system is unstable in this condition. In FIG. 13, the horizontal coordinate represents time t in units of s, while the vertical coordinate represents the output current $I_g$ of the grid-connected converter in units of A.

What is claimed is:

1. A method for determining a stability criterion for a control loop of a grid-connected converter under a weak grid condition, wherein the control loop of the grid-connected converter includes a current control loop, a controller, and a phase-locked loop (PLL), and the determination of the stability criterion for the control loop of the grid-connected converter under the weak grid condition includes the following steps:

step 1: performing a real-time sampling to obtain an output current $I_g$ of the grid-connected converter and an output voltage $U_g$ of the grid-connected converter, and providing an expression of a grid impedance link $G_1(s)$ of the grid-connected converter, an expression of a closed-loop transfer function $G_2(s)$ for the PLL of the grid-connected converter, and an expression of a closed-loop transfer function $G_3(s)$ for the current control loop of the grid-connected converter without considering the influence of the PLL, where the expression of the grid impedance link $G_1(s)$ of the grid-connected converter is as follows:

$$G_1(s) = -\frac{I_g}{U_g}(sL_{grid} + R_{grid}),$$

where s is a Laplace operator, $L_{grid}$ is an inductive component of the grid impedance, and $R_{grid}$ is a resistive component of the grid impedance;

the expression of the closed-loop transfer function $G_2(s)$ for the PLL of the grid-connected converter is as follows:

$$G_2(s) = \frac{2 \times \xi \times \omega_{pll} \times s + \omega_{pll}^2}{s^2 + 2 \times \xi \times \omega_{pll} \times s + \omega_{pll}^2},$$

where $\xi$ is a damping ratio of the PLL, and $\omega_{pll}$ is a control bandwidth of the PLL; and the expression $G_3(s)$ of the closed-loop transfer function $G_3(s)$ for the current control loop of the grid-connected converter without considering the influence of the PLL is as follows:

$$G_3(s) = \frac{G_{CL}G_{main}}{1 + G_{CL}G_{main}},$$

where $G_{CL}$ is a transfer function for a proportional-integral (PI) link of the current control loop, and $G_{main}$ is a transfer function for a filtration link of the grid-connected converter;

step 2: providing an expression of an open-loop transfer function $G_{IL}(s)$ for the current control loop of the grid-connected converter considering the influence of the PLL:

$$G_{IL}(s) = G_1(s) \times G_2(s) \times G_3(s)$$

$$= \left[\frac{I_g}{U_g}(sL_{grid} + R_{grid})\right] \times \left[\frac{2 \times \xi \times \omega_{pll} \times s + \omega_{pll}^2}{s^2 + 2 \times \xi \times \omega_{pll} \times s + \omega_{pll}^2}\right] \times$$

$$\left[\frac{G_{CL}G_{main}}{1 + G_{CL}G_{main}}\right]$$

$$= -\frac{I_g}{U_g} \times \frac{(2\xi\omega_{pll}s + \omega_{pll}^2)(sL_{grid} + R_{grid})}{s^2 + 2\xi\omega_{pll}s + \omega_{pll}^2} \times$$

$$\frac{G_{CL}G_{main}}{1 + G_{CL}G_{main}}$$

step 3: providing an expression of a combined transfer function $G_{pll\_grid}(s)$ for a grid impedance and the PLL of the grid-connected converter, and performing identical transformation on the open-loop transfer function $G_{IL}(s)$ for the current control loop in step 2, where the expression of the combined transfer function $G_{pll\_grid}(s)$ for the grid impedance and the PLL of the grid-connected converter is as follows:

$$G_{pll\_grid}(s) = G_1(s) \times G_2(s)$$

$$= -\frac{I_g}{U_g} \times \frac{(sL_{grid} + R_{grid})(2 \times \xi \times \omega_{pll} \times s + \omega_{pll}^2)}{s^2 + 2 \times \xi \times \omega_{pll} \times s + \omega_{pll}^2};$$

the identical transformation on the open-loop transfer function $G_{IL}(s)$ for the current control loop leads to:

$$G_{IL}(s) = G_{pll\_grid}(s) \times G_3(s)$$
$$= G_{pll\_grid}(s)/(1/G_3(s))$$
$$= G_{pll\_grid}(s)/(G_{current}(s))$$

where $G_{current}(s) = 1/G_3(s)$, which is labeled as a criterion transfer function for the current control loop of the grid-connected converter without considering the influence of the PLL; and step 4: further providing a stability criterion for the control loop of the grid-connected converter under a weak grid condition according to a transfer function of each link in the foregoing three steps by specifically:

step 4.1: obtaining a phase expression and an amplitude expression of each of the combined transfer function $G_{pll\_grid}(s)$ for the grid impedance and the PLL of the grid-connected converter and the criterion transfer function $G_{current}(s)$ for the current control loop of the grid-connected converter without considering the influence of the PLL in the frequency domain, where an amplitude and a phase of the combined transfer function $G_{pll\_grid}(s)$ for the grid impedance and the PLL of the grid-connected converter in the frequency domain are respectively labeled as a combined amplitude $A_{pll\_grid}(\omega)$ and a combined phase $\psi_{pll\_grid}(\omega)$, the combined amplitude $A_{pll\_grid}(\omega)$ and the combined phase $\psi_{pll\_grid}(\omega)$ being respectively expressed by:

$$\begin{cases} A_{pll\_gird}(\omega) = 20\log\left(\frac{I_g}{U_g} \times \frac{\sqrt{\omega^2 L_{grid}^2 + R_{grid}^2} \times \sqrt{(2\xi\omega_{pll}\omega)^2 + \omega_{pll}^4}}{\sqrt{(2\xi\omega_{pll})^2 + (\omega_{pll}^2 - \omega^2)^2}}\right) \\ \psi_{pll\_gird}(\omega) = \arctan\left(\frac{\omega L_{grid}}{R_{grid}}\right) + \arctan\left(\frac{2\xi\omega\omega_{pll}}{\omega_{pll}^2}\right) - \arctan\left(\frac{2\xi\omega\omega_{pll}}{\omega_{pll}^2 - \omega^2}\right) \end{cases}$$

where $\omega$ is a rotational angular frequency of the frequency domain; and an amplitude and a phase of the criterion transfer function $G_{current}(s)$ for the current control loop of the grid-connected converter without considering the influence of the PLL in the frequency domain are respectively labeled as a current amplitude $A_{current}(\omega)$ and a current phase $\psi_{current}(\omega)$, the current amplitude $A_{current}(\omega)$ and the current phase $\psi_{current}(\omega)$ being respectively expressed by:

$$\begin{cases} A_{current}(\omega) = \frac{|G_{CL}(\omega)||G_{main}(\omega)|}{|1 + G_{CL}(\omega)G_{main}(\omega)|} \\ \psi_{current}(\omega) = \angle G_{CL}(\omega) + \angle G_{main}(\omega) - \angle(1 + G_{CL}(\omega)G_{main}(\omega)) \end{cases},$$

where $G_{CL}(\omega)$ is an expression of the transfer function $G_{CL}$ for the PI link of the current control loop in the frequency domain, $|G_{CL}(\omega)|$ is an amplitude of the transfer function $G_{CL}$ for the PI link of the current control loop in the frequency domain, $G_{main}(\omega)$ is an expression of the transfer function $G_{main}$ for the filtration link of the grid-connected converter in the frequency domain, $|G_{main}(\omega)|$ is an amplitude of the transfer function $G_{main}$ for the filtration link of the grid-connected converter in the frequency domain, $|1+G_{CL}(\omega)G_{main}(\omega)|$ is an amplitude of $1+G_{CL}(\omega)G_{main}(\omega)|$ in the frequency domain, $\angle G_{CL}(\omega)$ is a phase of $G_{CL}(\omega)$ in the frequency domain, $\angle G_{main}(\omega)$ is a phase of $G_{main}(\omega)$ in the frequency domain, and $\angle(1+G_{CL}(\omega)G_{main}(\omega))$ is a phase of $1+G_{CL}(\omega)G_{main}(\omega)$ in the frequency domain;

step 4.2: providing the stability criterion for the control loop of the grid-connected converter under the weak grid condition according to the amplitude expression and the phase expression obtained in step 4.1 by determining that the grid-connected converter system is stable when both an amplitude stability condition and a phase stability condition are satisfied; otherwise, determining that the control loop of the grid-connected converter is unstable, where the stability criterion for the control loop of the grid-connected converter under the weak grid condition is determined as follows:

the amplitude for the control loop of the grid-connected converter is stable if a phase difference between the combined phase $\psi_{pll\_grid}(\omega)$ and the current phase $Y_{current}(\omega)$ is 180°, and $A_{current}(\omega_{180°}) > A_{pll\_grid}(\omega_{180°})$;

the phase for the control loop of the grid-connected converter is stable if the combined amplitude $A_{pll\_grid}(\omega)$ is the same as the current amplitude $A_{current}(\omega)$, and $\psi_{pll\_grid}(\omega_{crossover}) - \psi_{current}(\omega_{crossover}) - 180° > 0$; and the whole grid-connected converter is stable if the control loop of the grid-connected converter can both satisfy the amplitude stability condition and the phase stability condition, where,
- $\omega_{180°}$ is a corresponding angular frequency when the phase difference between the combined phase $\psi_{pll\_grid}(\omega)$ and the current phase $\psi_{current}(\omega)$ is 180°;
- $A_{current}(\omega_{180°})$ is an amplitude of the criterion transfer function $G_{current}(s)$ for the current control loop of the grid-connected converter without considering the influence of the PLL when the angular frequency is $\omega_{180°}$;
- $A_{pll\_grid}(\omega_{180°})$ is an amplitude of the combined transfer function for the grid impedance and the PLL of the grid-connected converter when the angular frequency is $\omega_{180°}$;
- $\omega_{crossover}$ is a corresponding angular frequency when the combined amplitude $A_{pll\_grid}(\omega)$ is the same as the current amplitude $A_{current}(\omega)$;
- $\psi_{current}(\omega_{crossover})$ is a phase of the criterion transfer function $G_{current}(s)$ for the current control loop of the grid-connected converter without considering the influence of the PLL when the angular frequency is $\omega_{crossover}$; and
- $\omega_{pll\_grid}(\omega_{crossover})$ is a phase of the combined transfer function $G_{pll\_grid}(s)$ for the grid impedance and the PLL of the grid-connected converter when the angular frequency is $\omega_{crossover}$;

step 4.3: providing an amplitude margin expression $A_M$ and a phase margin expression $P_M$ of the grid-connected converter system under the weak grid condition according to the phase expression and the amplitude expression of each of the combined transfer function $G_{pll\_grid}(s)$ for the grid impedance and the PLL of the grid-connected converter and the criterion transfer function $G_{current}(s)$ for the current control loop of the grid-connected converter without considering the influence of the PLL in the frequency domain in step 4.1 and in combination with the stability criterion for the control loop in step 4.2:

$$\begin{cases} A_M = A_{current}(\omega_{180°}) - A_{pll\_grid}(\omega_{180°}) \\ P_M = \psi_{pll\_grid}(\omega_{crossover}) - \psi_{current}(\omega_{crossover}) - 180° \end{cases}.$$

step 5: based on the determined stability criterion, automatically adjusting, by the controller, at least one parameter of the current control loop or the PLL of the grid-connected converter in real time to maintain or improve system stability, wherein the adjustment comprises generating and outputting a control signal to the grid-connected converter to modify its operation in response to the determined stability criterion.

\* \* \* \* \*